(12) United States Patent
Tasaka et al.

(10) Patent No.: US 7,768,603 B2
(45) Date of Patent: Aug. 3, 2010

(54) LIQUID CRYSTAL DISPLAY DEVICE AND METHOD OF MANUFACTURING THE SAME

(75) Inventors: Yasutoshi Tasaka, Matsusaka (JP); Hidefumi Yoshida, Machida (JP); Kunihiro Tashiro, Matsusaka (JP); Yoshinori Tanaka, Yonago (JP); Seiji Doi, Katsuragi (JP); Tomoshige Oda, Yonago (JP); Isao Tsushima, Herts (GB)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 936 days.

(21) Appl. No.: 11/104,288

(22) Filed: Apr. 12, 2005

(65) Prior Publication Data

US 2005/0270447 A1 Dec. 8, 2005

(30) Foreign Application Priority Data

Jun. 3, 2004 (JP) .............................. 2004-165320

(51) Int. Cl.
*G02F 1/1335* (2006.01)
(52) U.S. Cl. ..................................... 349/113; 349/114
(58) Field of Classification Search ................. 349/114, 349/113
See application file for complete search history.

(56) References Cited

U.S. PATENT DOCUMENTS

| 5,734,455 | A | 3/1998 | Yoshida et al. |
|---|---|---|---|
| 6,208,395 | B1 | 3/2001 | Kanoh et al. |
| 6,750,836 | B1 | 6/2004 | Katayama et al. |
| 6,819,379 | B2 * | 11/2004 | Kubo et al. ................. 349/114 |
| 6,839,107 | B2 * | 1/2005 | Kobashi ..................... 349/113 |
| 6,900,084 | B1 * | 5/2005 | Yamazaki .................... 438/158 |
| 2002/0071083 | A1 * | 6/2002 | Anno et al. ................. 349/147 |
| 2003/0053016 | A1 * | 3/2003 | Kubota et al. ............... 349/113 |
| 2003/0063244 | A1 * | 4/2003 | Fujimori et al. ............. 349/113 |
| 2004/0145689 | A1 * | 7/2004 | Sugiura et al. .............. 349/113 |

FOREIGN PATENT DOCUMENTS

| JP | 5-173158 | 7/1993 |
|---|---|---|
| JP | 2990046 | 10/1999 |
| JP | A 2005-55808 | 3/2005 |
| KR | 1995-33585 | 5/1999 |
| KR | 2001-0031885 | 4/2001 |

* cited by examiner

*Primary Examiner*—David Nelms
*Assistant Examiner*—W. Patty Chen
(74) *Attorney, Agent, or Firm*—Kratz, Quintos & Hanson, LLP

(57) ABSTRACT

Opening portions (opening patterns) having different arrangement pitches and sizes are formed in first metal film patterns, a first semiconductor film, second metal film patterns, a third insulating film, and the like under a reflective electrode, respectively. These opening portions overlap each other complexly to form fine bumps and dips in the surface of the reflective electrode. Further, the opening portions can be formed in the first metal film patterns, the first semiconductor film, and the second metal film patterns simultaneously with the formation of TFTs. Accordingly, an increase in the number of steps can be avoided.

10 Claims, 18 Drawing Sheets

LIQUID CRYSTAL DISPLAY DEVICE AND METHOD OF MANUFACTURING THE SAME

CROSS-REFERENCE TO RELATED APPLICATIONS

This application is based on and claims priority of Japanese Patent Application No. 2004-165320 filed on Jun. 3, 2004, the entire contents of which are incorporated herein by reference.

BACKGROUND OF THE INVENTION

1. Field of the Invention

The present invention relates to a reflective or semi-transmissive liquid crystal display device for displaying a picture by utilizing outside light. In particular, the present invention relates to a liquid crystal display device in which fine bumps and dips are provided in the surface of a reflective film, and relates to a method of manufacturing the same.

2. Description of the Prior Art

Liquid crystal display devices have the advantages that they are thin and light and that they can be driven at low voltages and have low power consumption, and are widely used in various kinds of electronic devices. In particular, active matrix liquid crystal display devices, in which a thin film transistor (TFT) is provided as a switching element for each picture element, also show excellent display quality comparable to that of cathode-ray tube (CRT) displays, and are therefore widely used as displays for televisions, personal computers, and the like.

A typical liquid crystal display device has a structure in which liquid crystals are contained between two substrates placed to face each other. On one substrate, TFTs, picture element electrodes, and the like are formed; on the other substrate, color filters, a common electrode, and the like are formed. Hereinafter, the substrate on which the TFTs, the picture element electrodes, and the like are formed is referred to as a TFT substrate, and the substrate placed to face the TFT substrate is referred to as a counter substrate.

Liquid crystal display devices include transmissive liquid crystal display devices in which a backlight is used as a light source and in which a picture is displayed using light passing through a liquid crystal panel, reflective liquid crystal display devices in which a picture is displayed by utilizing the reflection of outside light (natural light or lamp light), and semi-transmissive liquid crystal display devices in which a picture is displayed using a backlight in a dark place or using the reflection of outside light in a well-lighted place.

The reflective liquid crystal displays have the advantage that power consumption is smaller than that of the transmissive liquid crystal display devices because a backlight is unnecessary. Further, in a place where the surrounding area is well lighted, a picture often can be seen well in a reflective liquid crystal display device or a semi-transmissive liquid crystal display device utilizing outside light, compared to a transmissive liquid crystal display device utilizing a backlight.

Incidentally, in reflective liquid crystal display devices and semi-transmissive liquid crystal display devices, if the surface of a film (reflective film) for reflecting light is smooth, a range (viewing angle) in which a picture can be seen well becomes extremely narrow, and the problems of glare and the like occur. Accordingly, it is necessary to scatter light by providing fine bumps and dips in the surface of the reflective film.

Heretofore, a method has been proposed in which fine bumps and dips are formed in the surface of a reflective film. For example, in Japanese Unexamined Patent Publication No. Hei 5(1993)-173158, a technology is described in which bumps and dips are formed in the surface of an organic insulating film (polyimide film) using photolithography and dry etching and in which a reflective film is formed thereon. Further, in the specification of Japanese Patent No. 2990046, a technology is described in which bumps and dips are formed by utilizing at least one of a metal film, an insulating film, and a semiconductor film used to form a switching element (TFT) and in which a reflective film is formed thereon with an insulating film interposed therebetween.

However, the inventors of the present application consider that the above-described known technologies have the problems described below. That is, the technology disclosed in Japanese Unexamined Patent Publication No. Hei 5(1993)-173158 requires the step of spreading photosensitive resin (photoresist) on the organic insulating film, the steps of exposure and development, and the step of dry etching. Accordingly, with an increase in the number of steps, manufacturing cost increases, and yield decreases.

In the technology described in the specification of Japanese Patent No. 2990046, a metal film, an insulating film, and a semiconductor film are deposited, these films are etched by photolithography, bumps and dips are formed simultaneously with TFTs, then an insulating film is formed on the entire surface, and further a reflective film is formed thereon. An increase in the number of manufacturing steps can be avoided by forming the bumps and dips simultaneously with the TFTs as described above. However, with this technology, it is difficult to form bumps and dips at high density because the density of bumps and dips depends on the resolution of photolithography.

Moreover, in part of embodiments described in the specification of Japanese patent No. 2990046, a glass substrate is etched. However, if a glass substrate is etched, impurities contained in the glass substrate are eluted to contaminate liquid crystals, and display quality may be significantly impaired.

SUMMARY OF THE INVENTION

In light of the above, an object of the present invention is a liquid crystal display device provided with a reflective film having fine bumps and dips in the surface thereof at high density.

Another object of the present invention is to provide a method of manufacturing a liquid crystal display device in which a reflective film having fine bumps and dips in the surface thereof at high density can be formed in a small number of steps.

The aforementioned problems are solved by a liquid crystal display device including: a first substrate; a second substrate which is placed to face the first substrate and which transmits light; a reflective film which is formed on the first substrate and which reflects light passing through the second substrate; a plurality of films formed between the first substrate and the reflective film in a laminated manner; and liquid crystals contained between the first and second substrates. In this liquid crystal display device, patterns having arrangement pitches which are different for each film are formed in the plurality of films, and bumps and dips corresponding to the patterns of the plurality of films are formed in a surface of the reflective film.

Further, the aforementioned problems are solved by a method of manufacturing a liquid crystal display device having a first substrate in which a thin film transistor and a reflective electrode are provided in each picture element, a second substrate placed to face the first substrate, and liquid crystals contained between the first and second substrates. In this method, simultaneously with formation of the thin film transistor, a plurality of films having patterns having arrangement pitches which are different for each film are formed in a laminated manner on a region of the first substrate in which the reflective electrode is formed, and then a reflective film having in a surface thereof bumps and dips corresponding to the patterns of the plurality of films is formed on the plurality of films, and serves as the reflective electrode.

In the embodiments, patterns having arrangement pitches which are different for each film are formed in at least two of the plurality of films placed under the reflective electrode. Thus, the patterns of the films overlap each other complexly, and random fine bumps and dips are formed. On the film in which the random fine bumps and dips are provided, a high-reflectance film containing, for example, Al (aluminum) or Ag (silver) as a main constituent is formed and serves as the reflective electrode. Accordingly, in the surface of the reflective electrode, fine bumps and dips following the patterns provided in the films in the lower layers are formed. The density of the bumps and dips does not depend on the resolution of photolithography. This makes it possible to obtain favorable display characteristics during use as a reflective liquid crystal display device.

DESCRIPTION OF THE PREFERRED EMBODIMENTS

Hereinafter, the present invention will be described with reference to the accompanying drawings.

First Embodiment

Figure 1:
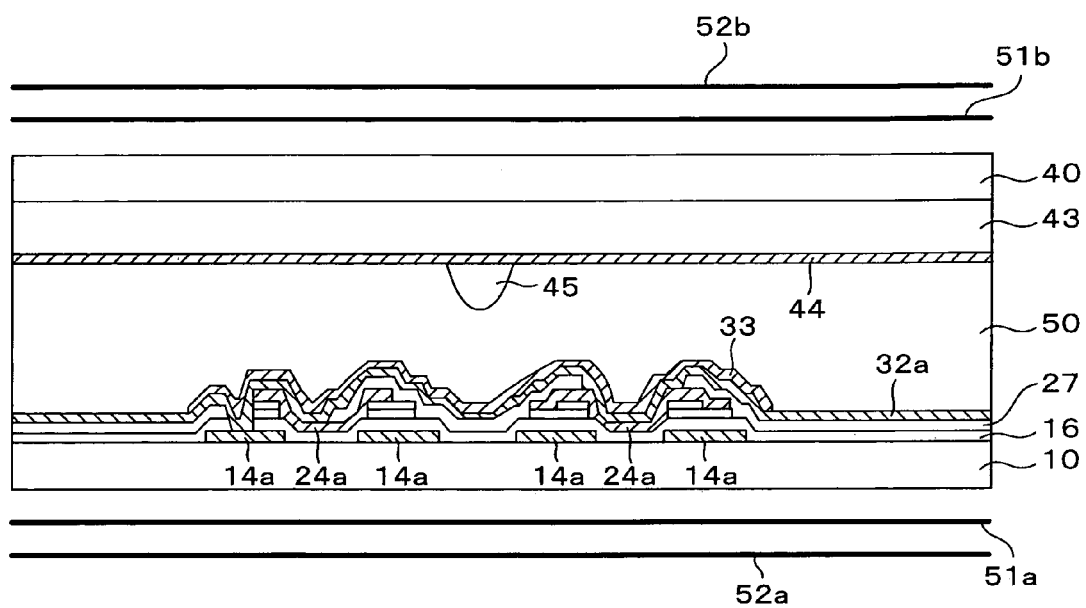
FIG. 1 is a cross-sectional view showing a liquid crystal display device of a first embodiment of the present invention.
Figure 2:
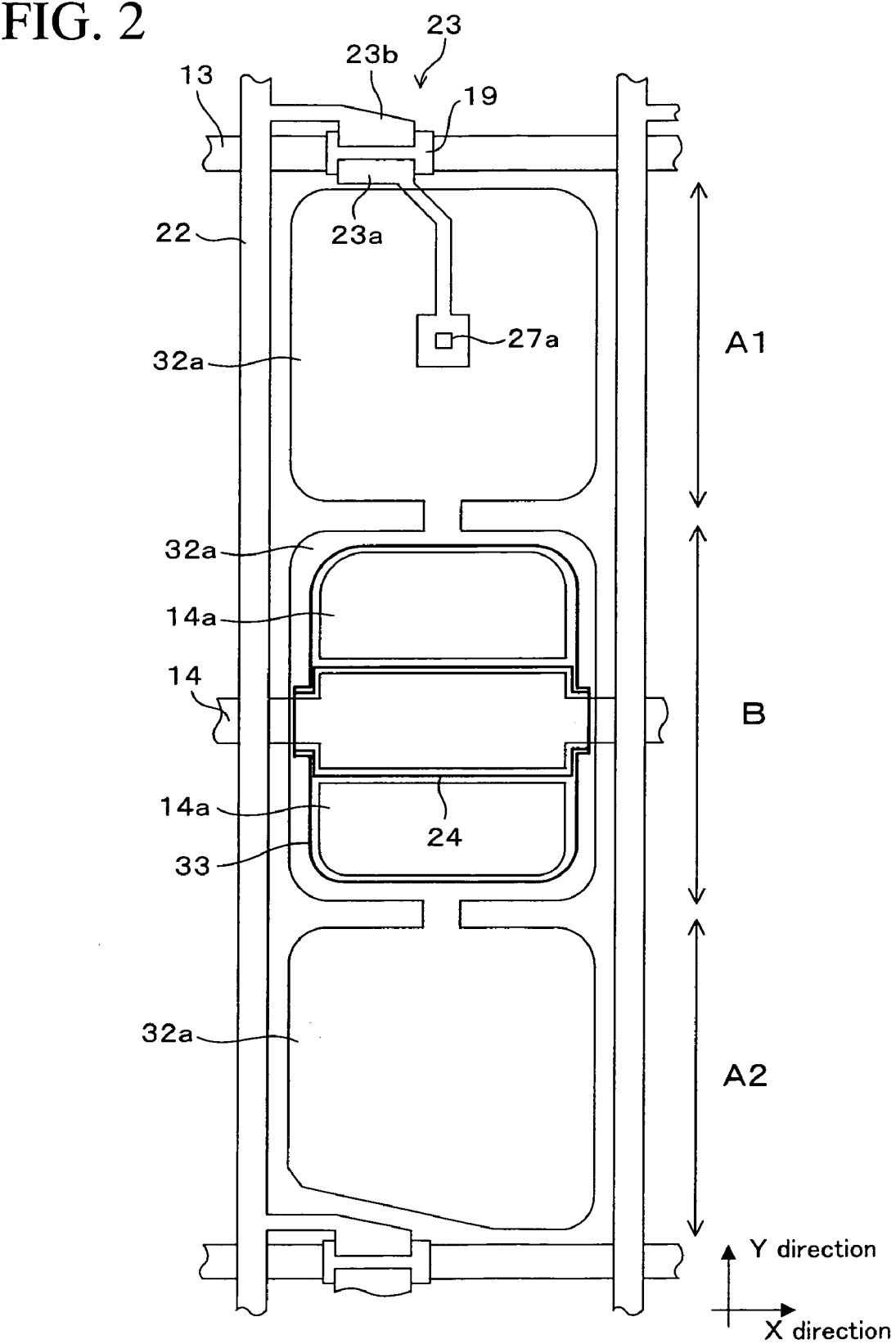
FIG. 2 is a plan view of the liquid crystal display device of the first embodiment.

FIG. 1 is a cross-sectional view showing a liquid crystal display device of a first embodiment of the present invention, and FIG. 2 is a plan view of the same. The present embodiment is an example in which the present invention is applied to a semi-transmissive liquid crystal display device having channel protection-type TFTs.

As shown in FIG. 1, the liquid crystal display device of the present embodiment includes a TFT substrate 10 and a counter substrate 40 placed to face each other, and vertical alignment-type liquid crystals (liquid crystals with negative dielectric anisotropy) 50 contained between the TFT substrate 10 and the counter substrate 40. Under the TFT substrate 10, a $\lambda/4$ wavelength plate (phase plate) 51a and a polarizing plate 52a are placed, and a backlight (not shown) is placed at a lower position. On the other hand, over the counter substrate 40, a $\lambda/4$ wavelength plate (phase plate) 51b and a polarizing plate 52b are placed. The $\lambda/4$ wavelength plates 51a and 51b are placed so that the slow axes thereof are orthogonal to each other, and the polarizing plates 52a and 52b are placed so that the transmission axes are orthogonal to each other.

As shown in FIG. 2, a plurality of gate bus lines 13 extending in the X direction (horizontal direction) and a plurality of data bus lines 22 extending in the Y direction (vertical direction) are formed on the TFT substrate 10. The gate bus lines 13 are arranged parallel to each other with, for example, approximately 300 μm pitch, and the data bus lines 22 are arranged parallel to each other with, for example, approximately 100 μm pitch. Each of rectangular regions delimited by the gate bus lines 13 and the data bus lines 22 is a picture element region.

On the TFT substrate 10, auxiliary capacitor bus lines 14 which are placed parallel to the gate bus lines 13 and which cross the middles of the picture element regions are formed. A first insulating film (gate insulating film) 16 is formed between the gate bus lines 13 and the data bus lines 22 and between the auxiliary capacitor bus lines 14 and the data bus lines 22. The gate bus lines 13 and the auxiliary capacitor bus lines 14 are electrically isolated from the data bus lines 22 by the first insulating film 16.

Further, on the TFT substrate 10, a TFT 23 is formed for each picture element region. As show in FIG. 2, the TFT 23 uses part of the gate bus line 13 as a gate electrode, and uses as an active layer a semiconductor film (not shown) which is formed on the gate bus line 13 with the first insulating film 16 interposed therebetween and which has a predetermined size. Moreover, a channel protection film 19 is selectively formed over the gate bus line 13, and a source electrode 23a and a drain electrode 23b are placed on the opposite sides of the gate bus line 13 in the width direction to face each other. The drain electrode 23b of the TFT 23 is connected to the data bus line 22.

Each picture element region is divided into three regions arranged along the data bus line 22. Hereinafter, among the three regions, the middle region is referred to as a reflective region B, and the two regions placed with the reflective region B interposed therebetween are referred to as first and second transmissive regions A1 and A2, respectively. In each of the first and second transmissive regions A1 and A2 and the reflective region B, a transparent picture element electrode 32a having an approximately rectangular shape in which the corners are curved is formed. These transparent picture element electrodes 32a are formed of transparent conductive material, such as indium-tin oxide (ITO) or the like, and are electrically connected to each other through connection portions which are formed simultaneously with the transparent picture element electrodes 32a and which are made of transparent conductive material.

Moreover, on the transparent picture element electrode 32a of the reflective region B, a reflective electrode (reflective plate) 33 having an approximately rectangular shape in which the corners are curved is formed. In the surface of this reflective electrode 33, random fine bumps and dips are formed at high density by a method described later. Furthermore, under the reflective electrode 33, as described later, formed are an auxiliary capacitor electrode 24 constituting an auxiliary capacitor with the auxiliary capacitor bus line 14 and the first insulating film 16, first and second metal film patterns 14a and 24a in which opening portions for forming bumps and dips in the surface of the reflective electrode 33 are provided, a semiconductor film (not shown), an insulating film 27, and the like.

The source electrode 23a of the TFT 23 extends to a position under the central portion of the transparent picture element electrode 32a of the transmissive region A1, and is electrically connected to the relevant transparent picture element electrode 32a through a contact hole 27a.

The surfaces of the transparent picture element electrodes 32a and the reflective electrode 33 are covered with a vertical alignment film (not shown) made of, for example, polyimide.

On the other hand, as shown in FIG. 1, on one surface (lower surface in FIG. 1) of the counter substrate 40, a black matrix (not shown) and color filters 43 are formed. The black matrix is made of light-blocking material, for example, such as Cr (chromium) or the like, and placed at positions facing the gate bus lines 13, the data bus lines 22, and the TFTs 23 on the TFT substrate 10 side. The color filters 43 are classified into three types of red, green, and blue. A color filter of any one color among red, green, and blue is placed for each picture element. In the present embodiment, three picture elements of red, green, and blue which are placed adjacent to each other in the X direction constitute one pixel.

Under the color filters 43, a common electrode 44 made of transparent conductive material, such as ITO or the like, is formed. Under the common electrode 44, conical alignment regulation protrusions 45 made of dielectric material, for example, such as resin or the like, are formed. The alignment regulation protrusions 45 are placed at the positions of the centers of the transmissive regions A1 and A2 and the reflective region B, respectively. Further, the surfaces of the common electrode 44 and the alignment regulation protrusions 45 are covered with a vertical alignment film (not shown) made of, for example, polyimide.

Figure 3:
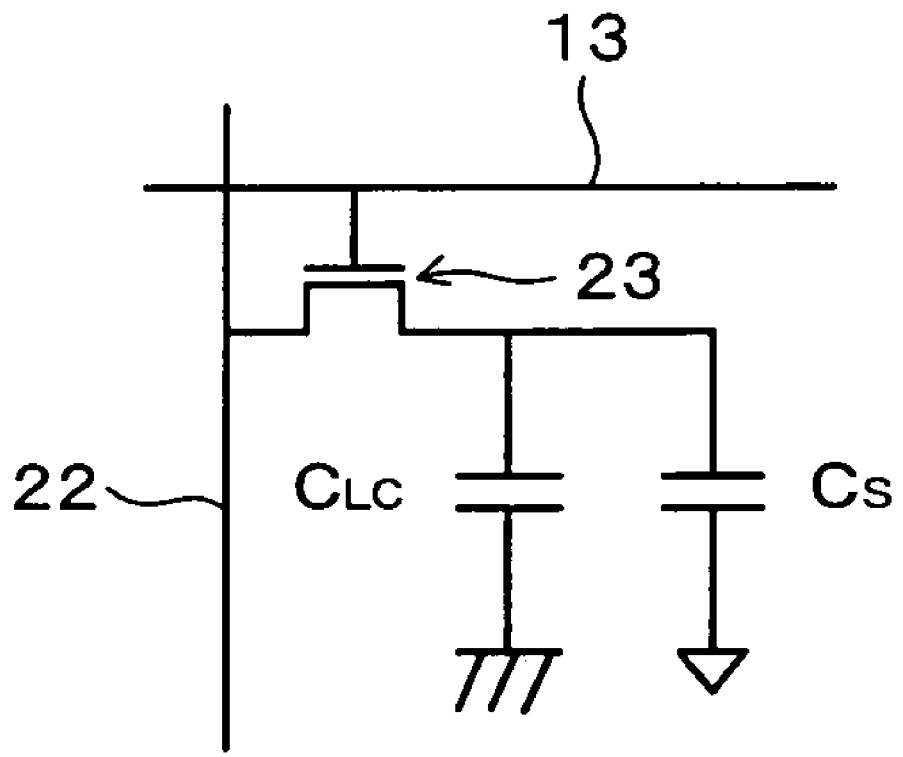
FIG. 3 is an equivalent circuit diagram for one picture element of the liquid crystal display device of the first embodiment.

FIG. 3 is an equivalent circuit diagram of one picture element of the liquid crystal display device of the present embodiment. As shown in this FIG. 3, an auxiliary capacitor Cs including the auxiliary capacitor bus line 14 and the auxiliary capacitor electrode 24 is connected in parallel to a capacitor CLC including the picture element electrodes (transparent picture element electrodes 32a and reflective electrode 33), the common electrode 44, and liquid crystals 50 therebetween, thus suppressing a decrease in a display voltage written into the picture element electrodes through the TFT 23.

In the liquid crystal display device of the present embodiment constituted as described above, during use in a room or the like, the backlight placed under the TFT substrate 10 is turned on, and a picture is displayed using light passing through the liquid crystal panel. Meanwhile, during use in a well-lighted place, the backlight is turned off, and a picture is displayed using light reflected by the reflective electrode 33. In this case, viewing angle characteristics are favorable, and a favorable picture can be appreciated in a relatively wide range, because fine bumps and dips are formed in the surface of the reflective electrode 33 at high density.

Hereinafter, a method of manufacturing the liquid crystal display device of the present embodiment will be described. First, a method of manufacturing the TFT substrate 10 will be described with reference to FIGS. 4A to 4L and FIGS. 5A to 5F. It is noted that FIGS. 4A to 4L are cross-sectional views in the reflective region B, and that FIGS. 5A to 5F are plan views in the reflective region B.

Figure 4A:
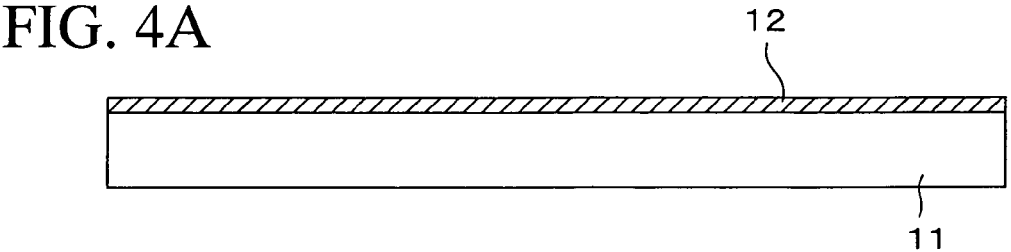
FIGS. 4A to 4L are cross-sectional views showing a method of manufacturing the liquid crystal display device of the first embodiment.
Figure 4B:
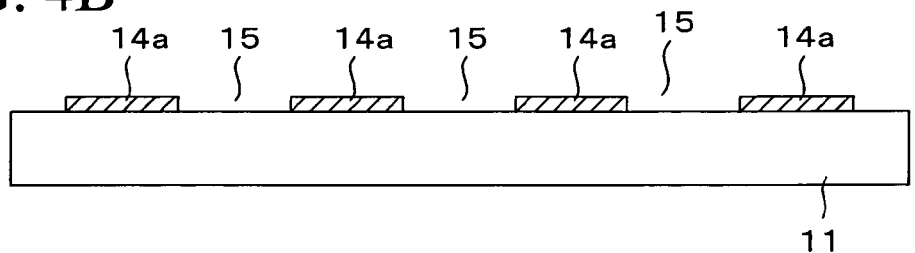

First, as shown in FIG. 4A, an Al (aluminum) film (approximately 150 nm), a MoN (molybdenum nitride) film (approximately 70 nm), and a Mo (molybdenum) film (approximately 15 nm) are sequentially formed on the entire upper surface of a glass substrate 11 which serves as the base of the TFT substrate 10 by, for example, sputtering, thus forming a first metal film 12 having a three-layered structure of the Al film, the MoN film, and the Mo film.

Incidentally, the first metal film 12 is not limited to the above-described constitution. However, it is preferable to adopt a constitution in which a low-resistance metal film of Al, Ag, or the like is covered with a metal film containing refractory metal, such as Ti (titanium), Mo, or the like, as a major constituent.

Figure 5A:
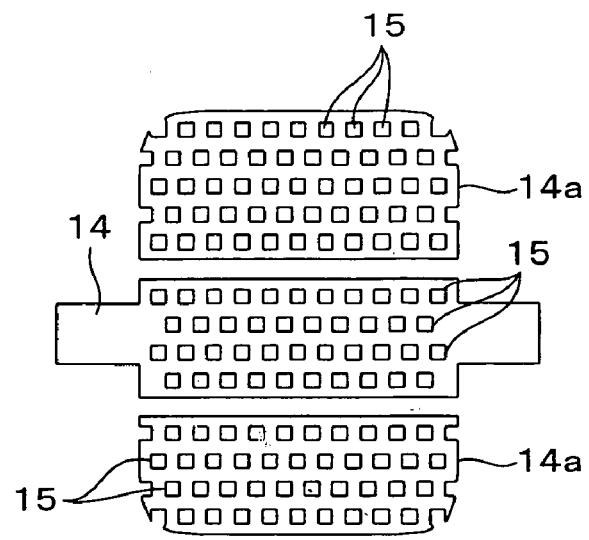
FIGS. 5A to 5F are plan views showing the method of manufacturing the liquid crystal display device of the first embodiment.

Thereafter, the first metal film 12 is patterned by photolithography, thus forming the gate bus line 13 and the auxiliary capacitor bus line 14 and, as shown in FIG. 5A, forming the first metal film patterns 14a at positions where the first metal film patterns 14a face each other across the auxiliary capacitor bus line 14 from the opposite sides in the Y direction. The width of the gate bus line 13 is set to, for example 10 µm. Further, the widths of portions of the auxiliary capacitor bus line 14 which connect adjacent picture elements are set to, for example, approximately 12 µm, and the width of a portion thereof (hereinafter referred to as a wide portion) which forms the auxiliary capacitor within the picture element is set to larger (e.g., 25 µm). Incidentally, the first metal film 12 is not limited to the above-described structure. The first metal film 12 can be formed using various metal materials.

Each first metal film pattern 14a has, for example, a length of approximately 30 µm in the Y direction and a length of approximately 55 µm in the X direction. As shown in FIG. 5A, the first metal film patterns 14a are placed away from the auxiliary capacitor bus line 14, and electrically isolated from the auxiliary capacitor bus line 14. Further, in the wide portion of the auxiliary capacitor bus line 14 and the first metal film patterns 14a, as shown in the cross-sectional view of FIG. 4B and the plan view of FIG. 5A, a plurality of opening portions (opening patterns) 15 are formed simultaneously with the formation of the auxiliary capacitor bus line 14 and the first metal film patterns 14a. Each of these opening portions 15 is, for example, a square (or circle with a diameter of 4 µm) with a side length of approximately 4 µm, and the center points of the opening portions 15 are located to coincide with the positions of vertices of equilateral triangles with a side length of 5.5 µm.

Incidentally, the cross section of each opening portion 15 preferably has a forward tapered shape of approximately 15 to 70°. This cross-sectional shape of each opening portion 15 depends on the structure (material and thickness of each layer) of the first metal film 12, the composition of etchant, and etching conditions (over etching conditions). In the case where the first metal film 12 has the aforementioned structure, for example, over etching of 30 to 75% can be performed using as etchant a mixed acid of phosphoric acid, nitric acid, and acetic acid.

Figure 4C:
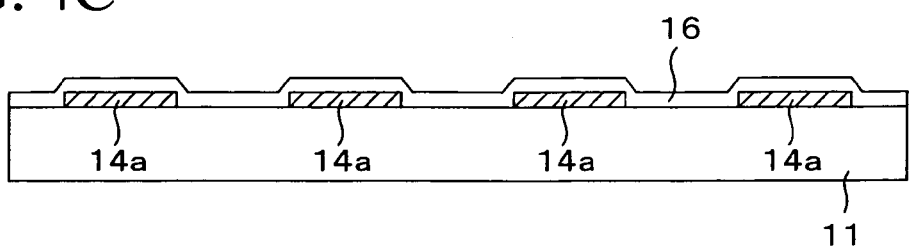

Next, as shown in FIG. 4C, the first insulating film (gate insulating film) 16 which is made of, for example, SiN (silicon nitride) and which has a thickness of approximately 350 nm is formed on the entire upper surface of the glass substrate 11. The gate bus line 13, the auxiliary capacitor bus line 14, and the first metal film patterns 14a are covered with this first insulating film 16.

Figure 4D:
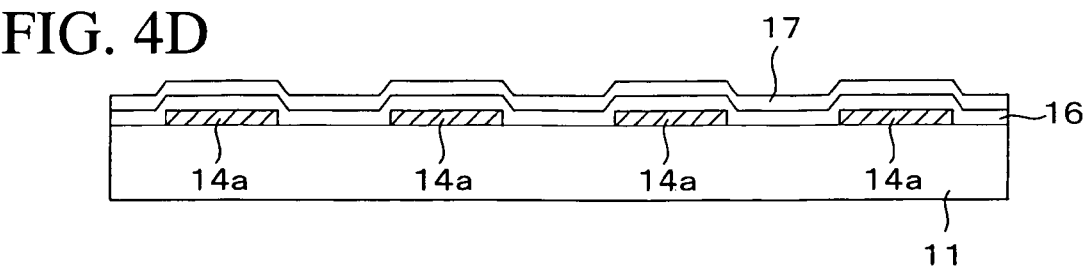
Figure 4E:
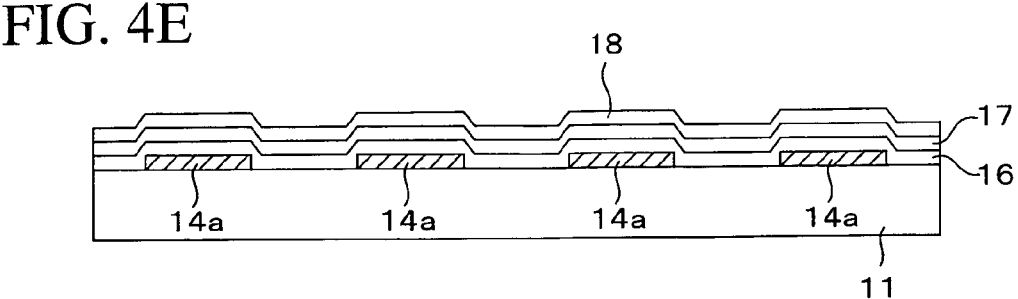
Figure 4F:
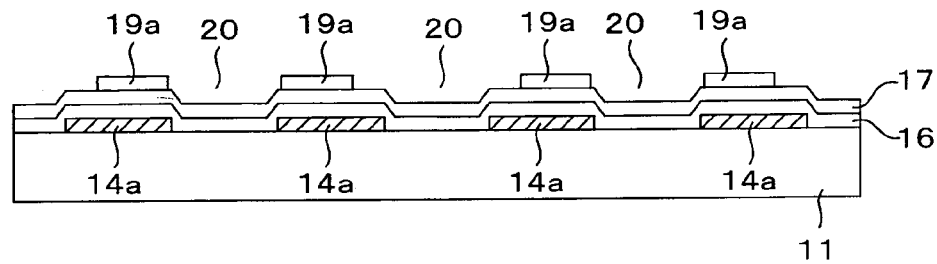
Figure 5B:
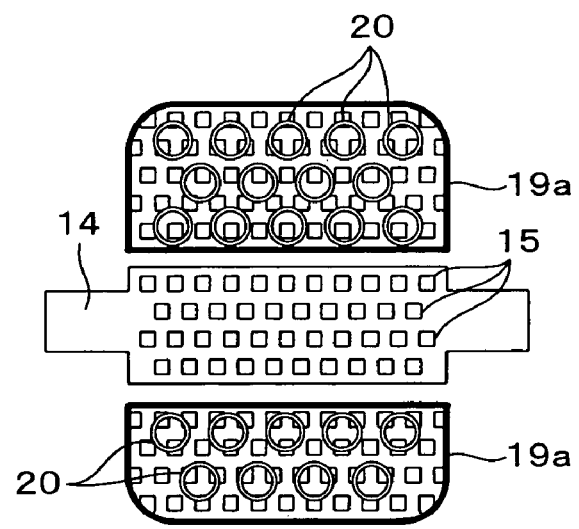

Then, as shown in FIG. 4D, a first semiconductor film 17 which is made of amorphous silicon and which has a thickness of 30 nm is formed on the first insulating film 16 by, for example, chemical vapor deposition (CVD). Subsequently, as shown in FIG. 4E, a second insulating film 18 which is made of, for example, SiN (silicon nitride) and which has a thickness of approximately 120 nm is formed. Thereafter, the second insulating film 18 is patterned by photolithography, thus forming the channel protection film 19 having, for example, a length of 10 μm in the Y direction and a length of 40 μm in the X direction over the gate bus line 13 as shown in the plan view of FIG. 2. Moreover, at this time, insulating patterns 19a are simultaneously formed over the first metal film patterns 14a as shown in FIGS. 4F and 5B. At this time, a plurality of second opening portions 20 with a diameter of approximately 7 μm are formed in the insulating film patterns 19a. These opening portions 20 are located at positions where the center positions thereof coincide with vertices of equilateral triangles with a side length of 10 μm.

Incidentally, in the present embodiment, the second insulating film 18 over the auxiliary capacitor bus line 14 is removed. This is because, if the second insulating film 18 exists over the auxiliary capacitor bus line 14, the distance between the auxiliary capacitor bus line 14 and the auxiliary capacitor electrode 24 increases, and it is difficult to match the capacitance value of the auxiliary capacitor Cs with a design value.

Moreover, the cross section of each opening portion 20 preferably has a forward tapered shape of approximately 15 to 70°. For example, in the case where the second insulating film 18 is dry-etched by reactive ion etching (RIE), the pressure in a chamber is set to 37.5 Pa, the type and flow rate of gas is set to $SF_6/O_2$=70/430 sccm (standard cc/min), and power is set to 600 W. Under these conditions, the etching rate of SiN becomes approximately 100 nm/min, and that of a resist film (photosensitive resin film) becomes 300 to 500 nm/min. Each opening portion 20 can be formed into a forward tapered shape in which the upper diameter is larger than the lower diameter by setting the resist film back from the second insulating film 18.

Figure 4G:
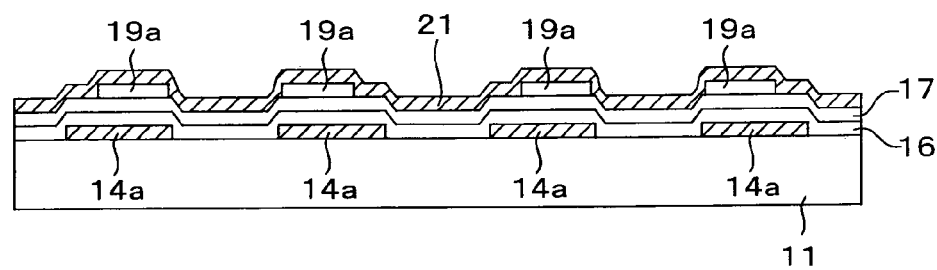

Next, a second semiconductor film (not shown) which is made of high-density n-type impurity amorphous silicon and which has a thickness of, for example, 30 nm and serves as an ohmic contact layer is formed on the entire upper surface of the glass substrate 11. Subsequently, as shown in FIG. 4G, for example, a Ti (titanium) film (having a thickness of 20 nm), an Al film (having a thickness of 75 nm), and a Ti film (having a thickness of 40 nm) are sequentially formed on the second semiconductor film, thus forming a second metal film 21 having a laminated structure of these films. The layer structure of the second metal film 21 is not limited to the above-described example, but, for example, may be a four-layered structure of a Ti film (having a thickness of 20 nm), an Al film (having a thickness of 75 nm), a MoN film (having a thickness of 70 nm), and a Mo film (having a thickness of 15 nm), or may be a four-layered structure of a MoN film (having a thickness of 50 nm), an Al film (having a thickness of 75 nm), a MoN film (having a thickness of 70 nm), and a Mo film (having a thickness of 15 nm).

Incidentally, the second metal film is also not limited to the above-described constitution. However, it is preferable to adopt a constitution in which a low-resistance metal film containing Al, Ag, or the like as a major constituent is sandwiched between refractory metal films containing Ti and Mo as major constituents.

Next, the second metal film 21, the second semiconductor film, and the first semiconductor film 17 are patterned by photolithography, thus simultaneously forming the data bus line 22, the source electrode 23a, the drain electrode 23b, the auxiliary capacitor electrode 24, and the second metal film patterns 24a. The width of the data bus line 22 is set to, for example, 7 μm. Further, as shown in FIG. 2, the source electrode 23a is extended to the central portion of the first transmissive region A1, and a connection portion having, for example, a square shape with a side length of 15 μm is formed at the tip portion thereof.

The auxiliary capacitor electrode 24 is formed to have a size, for example, obtained by widening the wide portion of the auxiliary capacitor bus line 14 by approximately 2 μm on each side in the Y direction. In this auxiliary capacitor electrode 24, bump and dip patterns are not formed. The auxiliary capacitor electrode 24 and the auxiliary capacitor bus line 14, which face each other with the first insulating film 16 interposed therebetween, constitute the auxiliary capacitor Cs shown in the equivalent circuit diagram of FIG. 3.

Figure 4H:
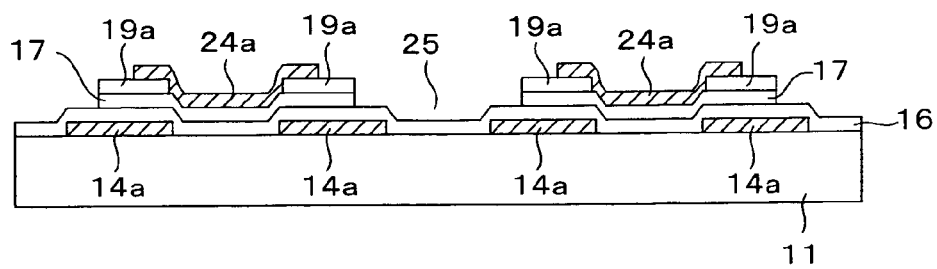
Figure 5C:
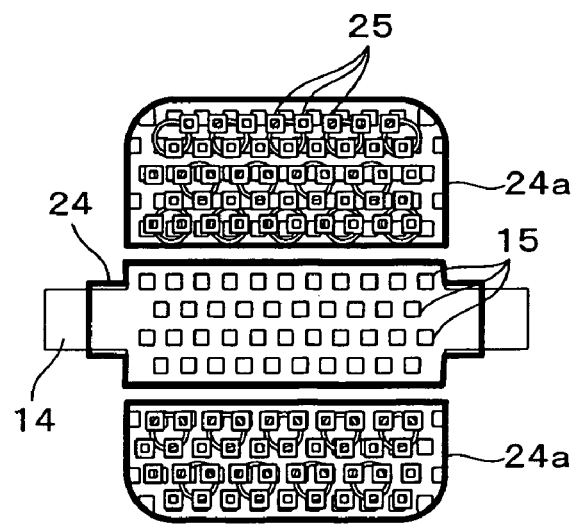
Figure 5D:
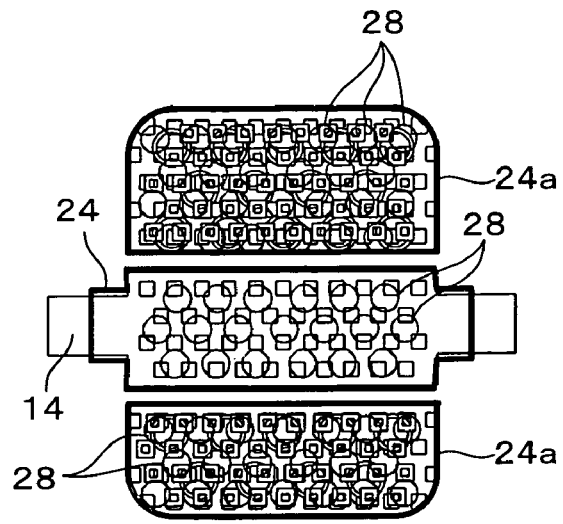
Figure 5E:
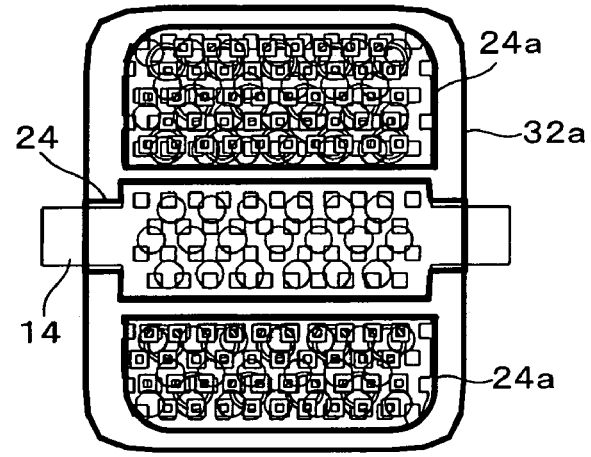

The second metal film patterns 24a are formed at positions facing the first metal film patterns 14a with the second insulating film 18 interposed therebetween. As shown in FIGS. 4H and 5C, in these second metal film patterns 24a, a plurality of opening portions 25 having, for example, an approximately square shape with a side length of approximately 4 μm are formed simultaneously with the formation of the second metal film patterns 24a. These opening portions 25 are located at positions where the center points thereof coincide with vertices of equilateral triangles with a side length of 6 μm.

Figure 4I:
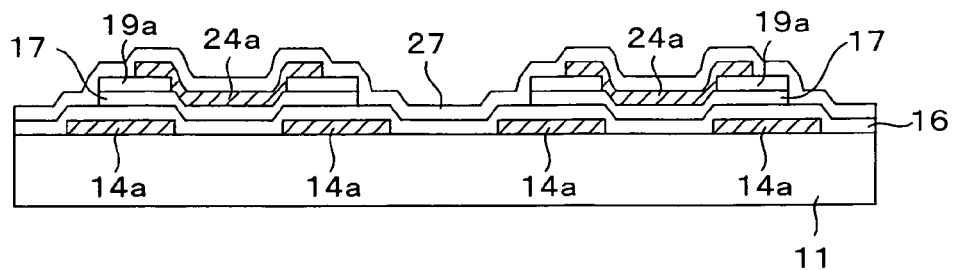
Figure 4J:
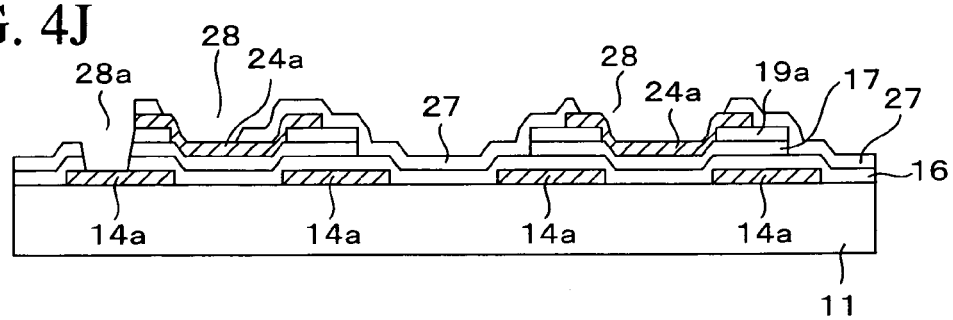

Next, as shown in FIG. 4I, a third insulating film 27 which is made of, for example, SiN and which has a thickness of approximately 330 nm is formed on the entire upper surface of the glass substrate 11, whereby the data bus line 22, the TFT 23, the auxiliary capacitor electrode 24, and the second metal film patterns 24a are covered with this third insulating film 27. Further, the third insulating film 27 is patterned by photolithography, thus forming the contact hole 27a communicating with the connection portion of the source electrode 22a and, as shown in the cross-sectional view of FIG. 4J and the plan view of FIG. 5D, forming a plurality of fourth opening portions 28 communicating with the auxiliary capacitor electrode 24 and the second metal film patterns 24a and contact holes 28a communicating with the first metal film patterns 14a. The opening portions 28 are located at positions where the center points thereof coincide with vertices of equilateral triangles with a side length of 7 μm.

Here, dry etching conditions for the third insulating film (SiN film) 27 are, for example, as follows: the pressure in a chamber is 6.7 Pa, the type and flow rate of etching gas are set to $SF_6/O_2$=200/200 (sccm), and power is 600 W. The third insulating film 27 has a laminated structure of two or more layers in which the upper layer is made of SiN of a high etching rate and in which the lower layer is made of SiN of a low etching rate, and the etched shape preferably becomes a forward tapered shape of 15 to 70°. Further, by previously adopting a film constitution in which the etching rates of the two SiN layers constituting the third insulating film 27 are higher than that of the first insulating film 16, the etched shapes of the first and third insulating films 16 and 27 becomes forward tapered shapes of 15 to 70°, respectively, and contact holes each having a step at the middle in the thickness direction are formed.

Under the above-described etching conditions, the etching rate of the first insulating film 16 becomes approximately 200 nm/min, that of the lower layer film of the third insulating film 27 becomes approximately 300 to 400 nm/min, that of the upper layer film of the third insulating film 27 becomes 400 to 500 nm/min, and that of a resist film becomes 200 to 300 nm/min. In the shape immediately after the etching, the third insulating film 27 is set back from the first insulating film 16. The amount of setback of the resist film and that of the first insulating film 16 are approximately equal to each other, and the shape of a canopy (roof) is obtained.

Figure 4K:
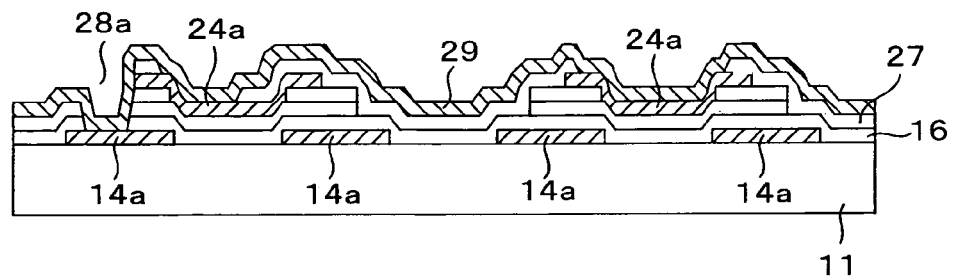

Next, as shown in FIG. 4K, a third metal film 29 is formed of transparent conductive material, such as ITO or the like, on the entire upper surface of the glass substrate 11. The film thickness of this third metal film 29 is set to, for example, 70 nm. This third metal film 29 is patterned by photolithography, thus forming the transparent picture element electrodes 32a shown in FIGS. 2 and 5E. The size of each of these transparent picture element electrodes 32a is, for example, an approximately square with a side length of 80 µm. Further, the distances between the transparent picture element electrodes 32a are, for example, 8 µm. These transparent picture element electrodes 32a are electrically connected to the source electrode 22a through the contact hole 27a provided in the third insulating film 27 and electrically connected to the auxiliary capacitor electrode 24 through the opening portions 28.

Figure 4L:
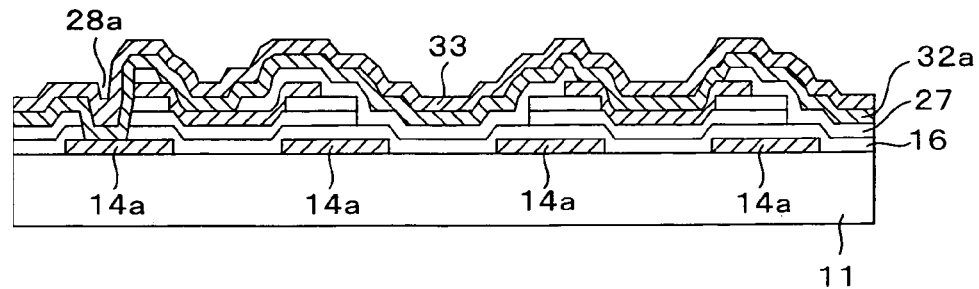
Figure 5F:
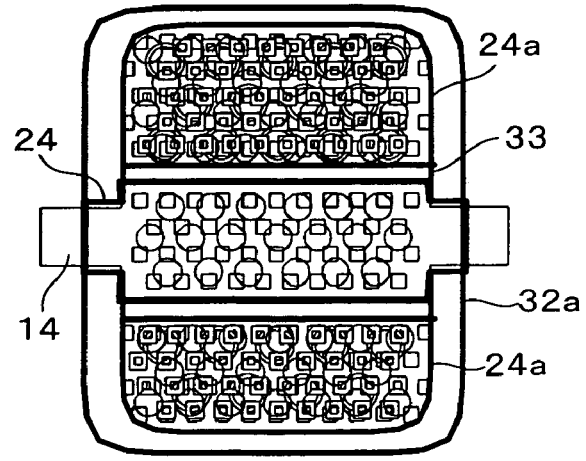

Subsequently, a fourth metal film is formed on the entire upper surface of the glass substrate 11. In this fourth metal film, at least the uppermost layer is formed of high-reflectance metal containing Al, Ag, or the like as a major constituent. Thereafter, the fourth metal film is patterned by photolithography, thus forming the reflective electrode 33 on the transparent picture element electrode 32a in the reflective region B as shown in FIGS. 4L and 5F.

In the present embodiment, as described above, sizes and arrangement pitches are different among the openings 15 in the auxiliary capacitor bus line 14 and the first metal film patterns 14a, the opening portions 20 in the second insulating patterns 19a, the opening portions 25 in the second metal film patterns 24a, and the opening portions 28 in the third insulating film 27. Accordingly, the overlaps among these opening portions 15, 20, 25, and 28 are not uniform. As a result, bumps and dips are formed in the surface of the reflective electrode 33. The density of these bumps and dips does not depend on the resolution of photolithography, and the bumps and dips are fine, random, and at high density. After random fine bumps and dips have been formed in the surface of the reflective electrode 33 at high density as described above, polyimide is spread on the entire upper surface of the glass substrate 11 to form a vertical alignment film. Thus, the TFT substrate 10 is completed.

Hereinafter, a method of manufacturing the counter substrate 40 will be described with reference to FIG. 1.

First, a metal film of, for example, Cr or the like is formed on the surface (lower surface in FIG. 1) of a glass substrate which serves as the base of the counter substrate 40, and this metal film is patterned to form the black matrix. Then, red, green, and blue color filters 43 are formed using red, green, and blue photosensitive resins. Incidentally, the black matrix may be formed of black resin or made by laminating color filters of two or more colors, among red, green, and blue color filters, together.

Next, the common electrode 44 is formed on the entire upper surface of the glass substrate by sputtering transparent conductive material, for example, such as ITO or the like. Then, photosensitive resin is spread on the common electrode 44, and exposure and development are performed, thus forming the alignment regulation protrusions 45. The alignment regulation protrusions 45 are formed at the central positions of the transmissive regions A1 and A2 and the reflective region B1. Each of these alignment regulation protrusions 45 has, for example, a diameter of 10 µm and a height of 2.5 µm.

Subsequently, for example, polyimide is spread on the surfaces of the common electrode 44 and the alignment regulation protrusions 45, thus forming a vertical alignment film (not shown). Thus, the counter substrate 40 is completed.

After the TFT substrate 10 and the counter substrate 40 have been formed as described above, the liquid crystals 50 with negative dielectric anisotropy ($\Delta\epsilon<0$) are filled into the space between the TFT substrate 10 and the counter substrate 40 by vacuum injection or drop injection, thus forming a liquid crystal panel. Thereafter, the λ/4 wavelength plates 51a and 51b and the polarizing plates 52a and 52b are placed on both sides of the liquid crystal panel, and a backlight unit is attached thereto. Thus, the liquid crystal display device of the present embodiment is completed.

In the present embodiment, insulating films, semiconductor films, and metal films are formed in the reflective region B simultaneously with the formation of TFTs, and opening portions having different sizes and arrangement pitches are formed in these insulating films, semiconductor films, and metal films, respectively, whereby bumps and dips are formed in the surface of the reflective electrode. This makes it possible to relatively easily form a reflective electrode having fine bumps and dips in the surface thereof at high density without an increase in the number of steps.

Modified Example

Figure 6:
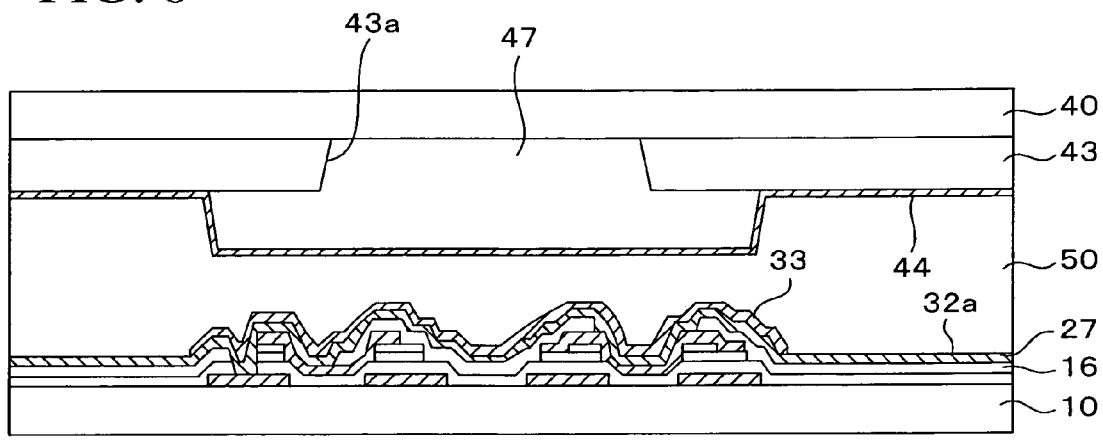
FIG. 6 is a cross-sectional view showing a liquid crystal display device of a modified example of the first embodiment.

FIG. 6 is a cross-sectional view showing a liquid crystal display device of a modified example of the first embodiment. It is noted that, in FIG. 6, the same components as those in FIG. 1 are denoted by the same reference numerals and will not be further described. Further, in FIG. 6, alignment regulation protrusions, λ/4 wavelength plates, and polarizing plates are not shown.

In the liquid crystal display device shown in FIG. 1, during use as a transmissive liquid crystal display device, light passes through the color filters 43 only once. Meanwhile, during use as a reflective liquid crystal display device, light passes through the color filters 43 twice, and the screen therefore looks dark.

In light of this, in the liquid crystal display device shown in FIG. 6, an opening portion 43a is provided in the color filter 43 in the reflective region B, and a transparent resin film 47 is formed in a portion corresponding to the opening portion 43a. If the transparent resin film 47 is formed in a portion of the reflective region B as described above, the screen can be made bright because the amount by which light is attenuated by the color filter 43 decreases.

In this case, if the opening portion 43a of the color filter 43 is too large, the proportion of light passing through the color filter 43 decreases, and color display characteristics deteriorate. However, by making the size of the opening portion 43a of the color filter 43 small, most of light passing through the transparent resin film 47 passes through the color filter 43 when entering into the liquid crystal panel or when emanating from the liquid crystal panel, and deterioration of color display characteristics can be avoided.

Moreover, as shown in FIG. 6, it becomes possible to adjust the cell gap of the reflective region B separately from the cell gaps of the transmissive regions A1 and A2 using the transparent resin film 47. That is, it is possible to set the cell gaps of the transmissive regions A1 and A2 to a value optimized for a transmissive liquid crystal display device, and to set the cell gap of the reflective region B to a value optimized for a reflective liquid crystal display device. Thus, in either of use as a transmissive liquid crystal display device or use as a reflective liquid crystal display device, excellent display performance can be obtained.

For the transparent resin film 47, a treatment for imparting optical diffusion capability is preferably performed in order to improve light scattering capability. For example, the transparent resin film can be formed by adding material (beads or the like having a refractive index which is different from that of transparent resin) for scattering light to transparent resin.

Second Embodiment

Hereinafter, a second embodiment of the present invention will be described.

FIGS. 7A to 7F are cross-sectional views showing a method of manufacturing a liquid crystal display device of the second embodiment of the present invention, and FIGS. 8A to 8D are plan views of the same. Incidentally, FIGS. 7A to 7F are cross-sectional views in a reflective region, and FIGS. 8A to 8D are plan views in the reflective region. Further, the present embodiment differs from the first embodiment in that a method of forming a reflective electrode is different. Except for this, the constitution is basically the same as that of the first embodiment. Accordingly, the same components as those of the first embodiment will be described with reference to FIG. 2. However, in FIGS. 8A to 8D, the shapes of opening portions (opening patterns) 15 in the auxiliary capacitor bus line 14 and the first metal film patterns 14a are circular. Further, the constitution of the counter substrate is the same as that of the first embodiment, and therefore will not be further described here.

Figure 7A:
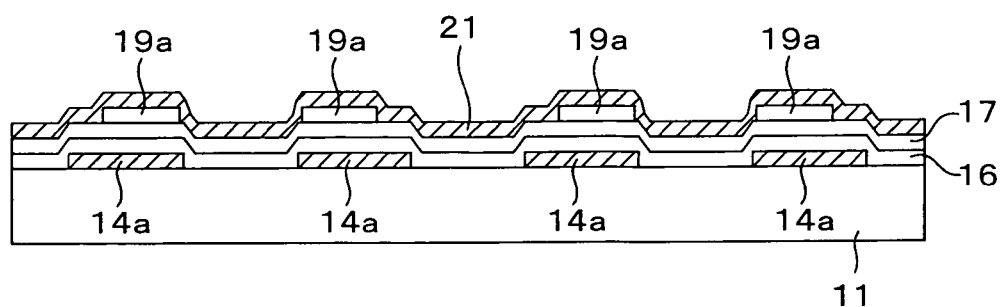
FIGS. 7A to 7F are cross-sectional views showing a method of manufacturing a liquid crystal display device of a second embodiment of the present invention.
Figure 8A:
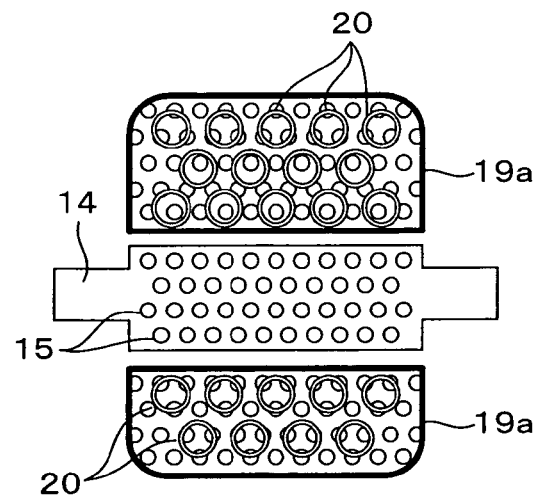
FIGS. 8A to 8D are plan views showing the method of manufacturing the liquid crystal display device of the second embodiment of the present invention.

First, as shown in FIGS. 7A and 8A, by the same method as that of the first embodiment, the gate bus line 13, the auxiliary capacitor bus line 14, the first metal film patterns 14a, the first insulating film 16, the first semiconductor film 17, and the insulating film pattern 19a are formed on the glass substrate 11, and the second metal film 21 is further formed thereon. This second metal film 21 is formed by, for example, depositing a Ti film having a thickness of 20 nm, an Al film having a thickness of 75 nm, and a Ti film having a thickness of 40 nm in this order from below. The second metal film 21 may have, for example, a four-layered structure of a Ti film (having a thickness of 20 nm), an Al film (having a thickness of 75 nm), a MoN film (having a thickness of 70 nm), and a Mo film (having a thickness of 15 nm), or a four-layered structure of a MoN film (having a thickness of 50 nm), an Al film (having a thickness of 75 nm), a MoN film (having a thickness of 70 nm), and a Mo film (having a thickness of 15 nm).

Incidentally, similar to the first embodiment, the opening portions 15 are formed in the wide portion of the auxiliary capacitor bus line 14 and the first metal patterns 14a, and the opening portions 20 are formed in the insulating film patterns 19a. Sizes and arrangement pitches are different between these opening portions 15 and 20.

Figure 7B:
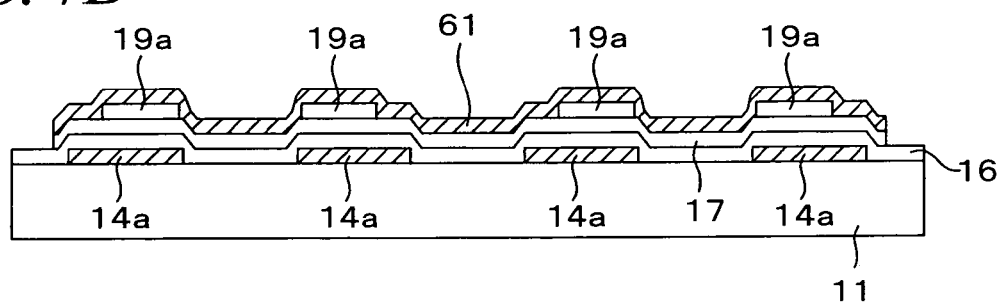
Figure 8B:
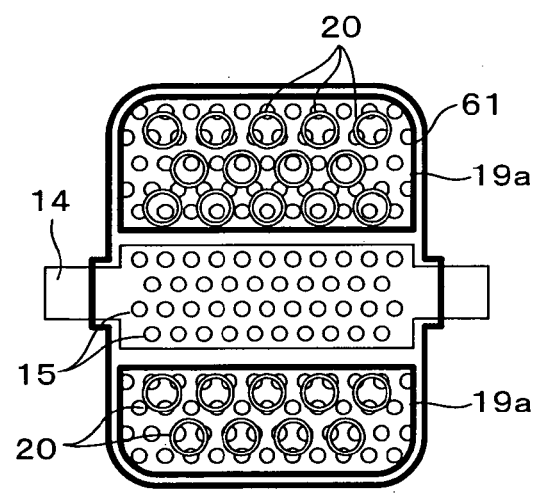

Next, the second metal film 21 is patterned by photolithography, thus forming the data bus line 22, the source electrode 23a, and the drain electrode 23b and, as shown in FIGS. 7B and 8B, forming a reflective electrode 61, which is also used as an auxiliary capacitor electrode, in the reflective region B.

Figure 7C:
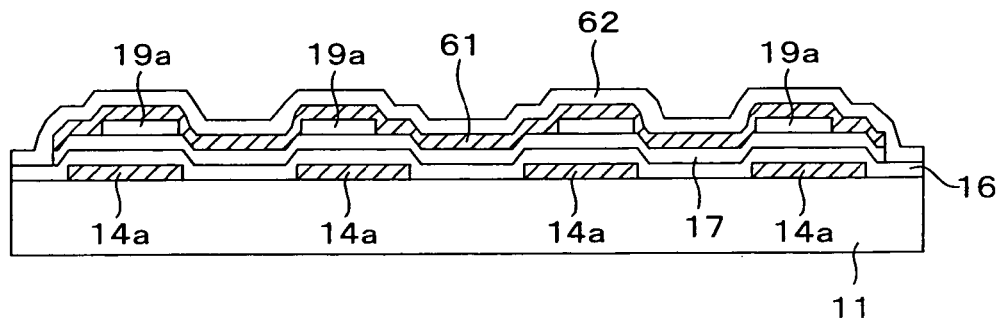

Subsequently, as shown in FIG. 7C, a third insulating film 62 is formed of, for example, SiN on the entire upper surface of the glass substrate 11, thus covering the data bus line 22, the TFT 23, and the reflective electrode 61 with this third insulating film 62.

Figure 7D:
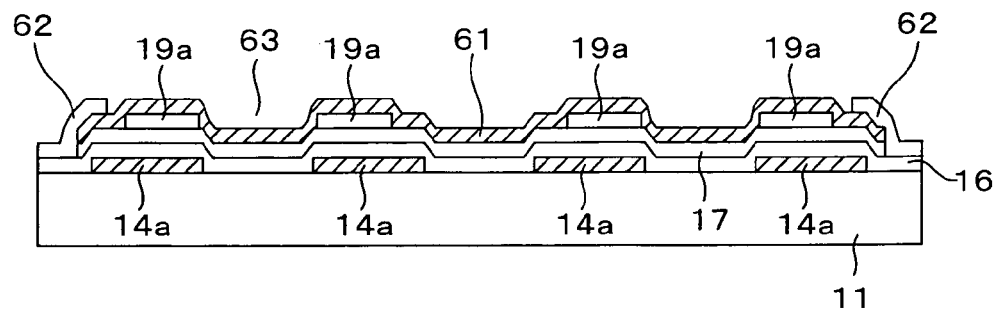
Figure 8C:
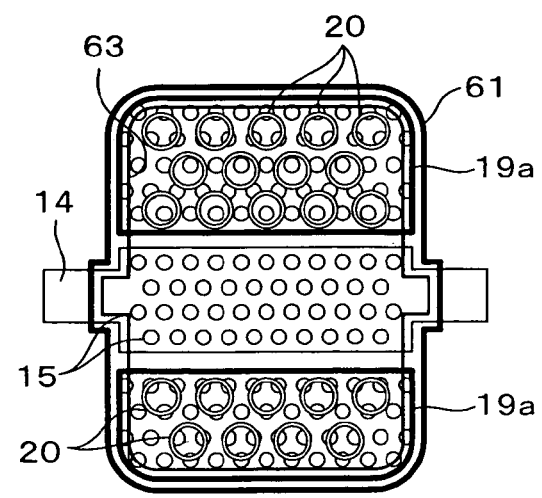

Thereafter, as shown in FIGS. 7D and 8C, the third insulating film 62 is patterned by photolithography, thus forming an opening portion 63 through which the reflective electrode 61 is exposed. It is noted, however, that the opening portion 63 is made smaller than the reflective electrode 61 by an amount corresponding to a margin of photolithography, and that the peripheral portion of the reflective electrode 61 is left covered with the third insulating film 62. Further, the etching of the third insulating film 62 is performed by, for example, dry etching using $SF_6/O_2$ gas.

In this photolithography step, the contact hole 27a is opened over the source electrode 23a, and opening portions are formed by etching the third insulating film 62 over end portions (connection terminal portions) of the data bus line 22 and the first and third insulating films 16 and 62 over end portions (connection terminal portions) of the gate bus line 13. During this etching, the Ti film (or MoN film and Mo film) in the uppermost layer of the second metal film 21 is etched and removed, and the Al film under the Ti film is exposed. By exposing the Al film, which is the intermediate layer of the second metal film 21, as described above, the reflectance of the reflective electrode increases compared to the case where a Ti film, a MoN film, a Mo film, or the like is exposed at the surface, and bright display can be performed.

Moreover, in typical dry etching of a SiN film in which $SF_6/O_2$ gas is used, since a Ti film, a MoN film, and a Mo film are easily etched but an Al film is not etched, it is possible to leave an Al film as an etching stopper. For dry etching conditions for the SiN film in this step, for example, the pressure in a chamber is set to 6.7 Pa, the type and flow rate of gas are set to $SF_6/O_2=200/200$ (sccm), and power is set to 600 W.

Figure 7E:
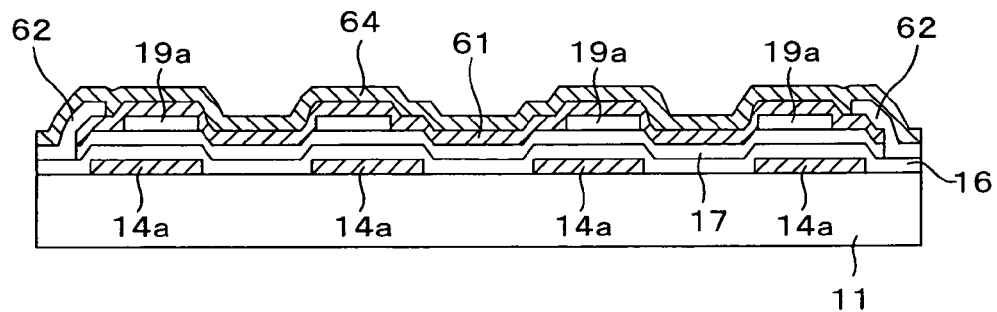

Next, as shown in FIG. 7E, transparent conductive material, such as ITO or the like, is sputtered onto the entire upper surface of the glass substrate 11, thus forming a third metal film 64.

Figure 7F:
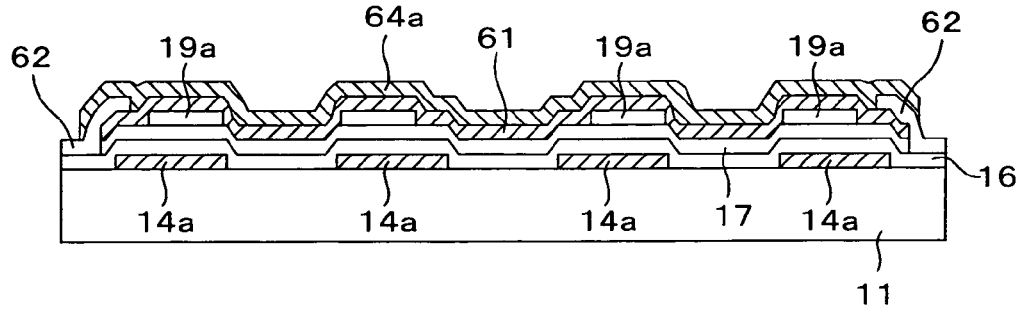
Figure 8D:
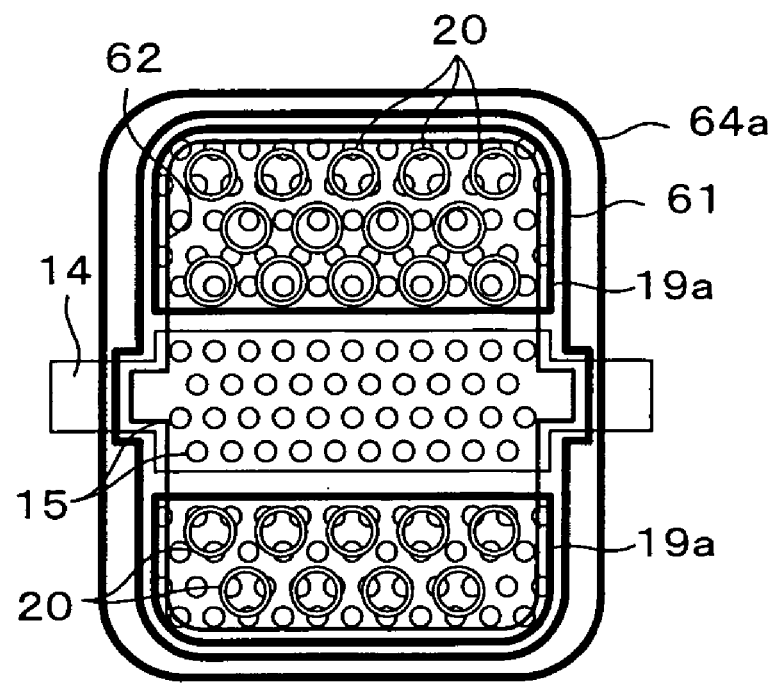

Thereafter, the third metal film 64 is patterned by photolithography, thus forming transparent picture element electrodes 64a in the first and second transmissive regions A1 and A2 and the reflective region B, respectively, as shown in FIGS. 7F and 8D.

Subsequently, similar to the first embodiment, a vertical alignment film (not shown) covering the surfaces of the transparent picture element electrodes 64a is formed. Thus, a TFT substrate is completed. Then, the TFT substrate and the counter substrate are placed to face each other, and liquid crystals are filled into the space between the TFT substrate and the counter substrate. Thus, the liquid crystal display device of the present embodiment is completed.

In the present embodiment, sizes and arrangement pitches are also different between the opening portions 15 formed in the auxiliary capacitor bus line 14 and the first metal film patterns 14a and the opening portions 20 formed in the insulating film patterns 19a. Accordingly, it is possible to form fine bumps and dips in the surface of the reflective electrode 61 at high density without addition of a manufacturing step. Further, in the present embodiment, since one step of forming a metal film is eliminated compared to the first embodiment, there is the advantage that manufacturing cost can be reduced.

Third Embodiment

Hereinafter, a third embodiment of the present invention will be described. In the present embodiment, an example will be described in which the present invention is applied to a method of manufacturing a liquid crystal display device having channel etch-type TFTs.

FIGS. 9A to 9F and FIGS. 10A to 10D are cross-sectional views showing a method of manufacturing a liquid crystal display device of the third embodiment of the present invention. FIGS. 9A to 9F are cross-sectional views in the reflective region B, and FIGS. 10A to 10D are cross-sectional views in a TFT formation portion. It is noted that, in the present embodiment, the same components as those of the first embodiment will also be described with reference to FIG. 2. Further, the structure of the counter substrate is the same as that of the first embodiment and therefore will not be further described here.

Figure 9A:
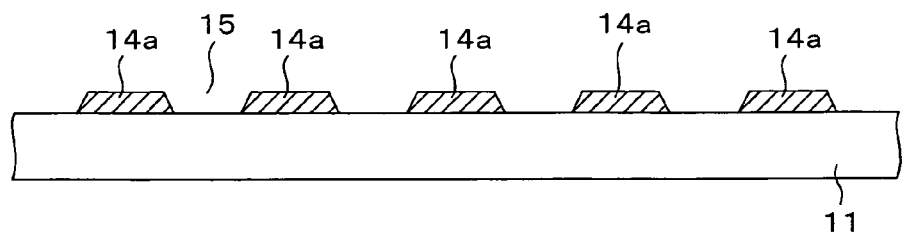
FIGS. 9A to 9F are cross-sectional views in a reflective region which show a method of manufacturing a liquid crystal display device of a third embodiment of the present invention.
Figure 10A:
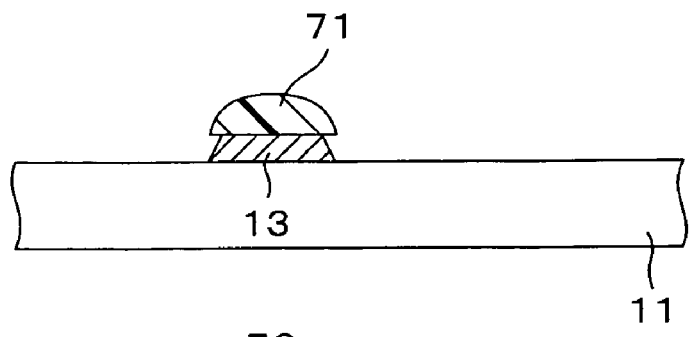
FIGS. 10A to 10D are cross-sectional views in a TFT formation portion which show the method of manufacturing the liquid crystal display device of the third embodiment of the present invention.

First, as shown in FIGS. 9A and 10A, an Al film, a MoN film, and a Mo film are sequentially formed on the upper side of the glass substrate 11 which serves as the base of the TFT substrate 10 by, for example, sputtering, thus forming a first metal film having a three-layered structure of the Al film, the MoN film, and the Mo film. Then, the first metal film is patterned by photolithography, thus forming the gate bus line 13, the auxiliary capacitor bus line 14, and the first metal film patterns 14a. At this time, similar to the first embodiment, a plurality of opening portions 15 are formed in each of the wide portion of the auxiliary capacitor bus line 14 and the first metal film patterns 14a. It is noted that, in FIG. 10A, reference numeral 71 denotes a resist film for forming the gate bus line 13.

Figure 9B:
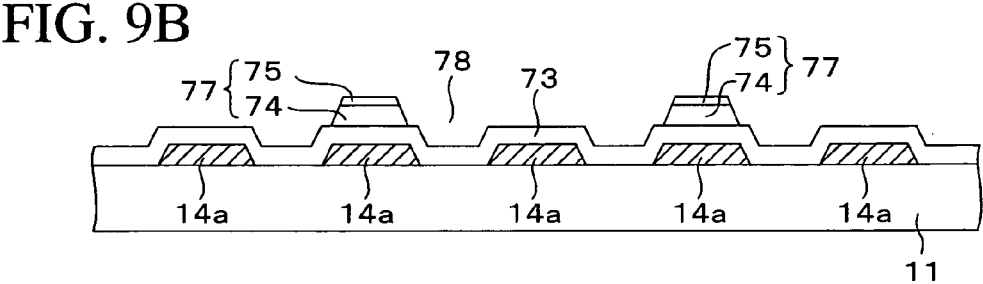
Figure 10B:
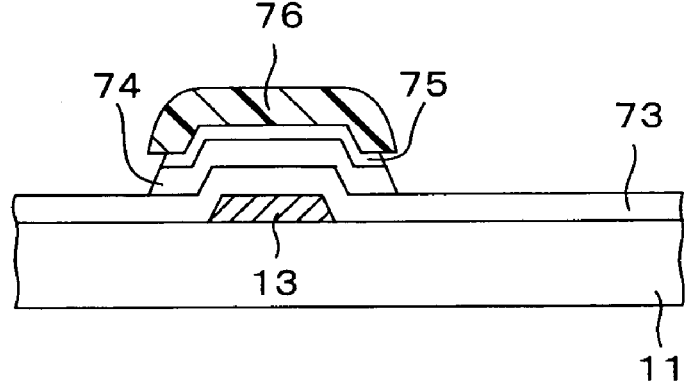

Next, as shown in FIGS. 9B and 10B, SiN is deposited on the entire upper surface of the glass substrate 11 by CVD to form a first insulating film 73, thus covering the gate bus line 13, the auxiliary capacitor bus line 14, and the first metal film patterns 14a with this first insulating film 73. Then, a first semiconductor film 74, which serves as an active layer of the TFT 23, is formed of undoped amorphous silicon or polysilicon on the first insulating film 73. Further, on the resultant structure, a second semiconductor film 75, which serves as an ohmic contact layer, is formed of amorphous silicon into which n-type impurities are introduced at high density. Thereafter, the first and second semiconductor films 74 and 75 are patterned by photolithography, thus forming an island-shaped semiconductor film in the TFT formation region as shown in FIG. 10B. It is noted that, in FIG. 10B, reference numeral 76 denotes a resist film for forming the island-shaped semiconductor film in the TFT formation region.

Moreover, simultaneously with this, as shown in FIG. 9B, semiconductor film patterns 77 including the first and second semiconductor films 74 and 75 are formed on the first insulating film 73 over the first metal film patterns 14a, and second opening portions 78 are formed in the semiconductor film patterns 77. These second opening portions 78 are formed to have sizes and arrangement pitches which are different from those of the first opening portions 15 formed in the auxiliary capacitor bus line 14 and the first metal film patterns 14a.

Figure 9C:
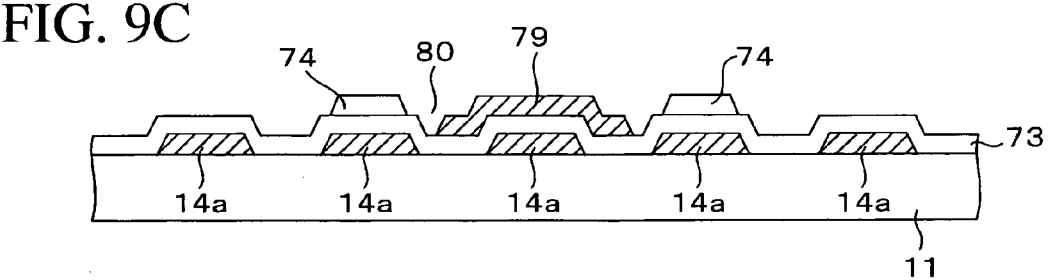
Figure 10C:
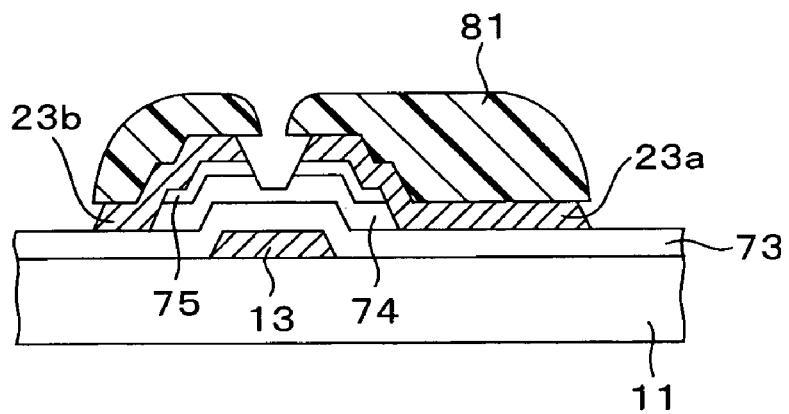

Next, a second metal film is formed on the entire upper surface of the glass substrate 11. This second metal film has, for example, a three-layered structure of a Ti film (having a thickness of 20 nm), an Al film (having a thickness of 75 nm), and a Ti film (having a thickness of 40 nm). Then, as shown in FIGS. 9C and 10C, the second metal film is patterned by photolithography, thus forming the data bus line 22, the source electrode 23a, the drain electrode 23b, and the second metal film pattern 79. At this time, as shown in FIG. 10C, the first and second semiconductor films 74 and 75 between the source electrode 23a and the drain electrode 23b are etched halfway in the thickness direction of the first semiconductor film 74, thus electrically isolating the second semiconductor film 75 under the source electrode 23a and the second semiconductor film 75 under the drain electrode 23b from each other. Further, second metal film patterns 79 are formed over the first metal film patterns 14a. In these second metal film patterns 79, third opening portions 80 are formed to have sizes and arrangement pitches which are different from those of the first and second opening portions 15 and 78. It is noted that reference numeral 81 in FIG. 10C denotes resist films for forming the source electrode 23a and the drain electrode 23b.

Figure 9D:
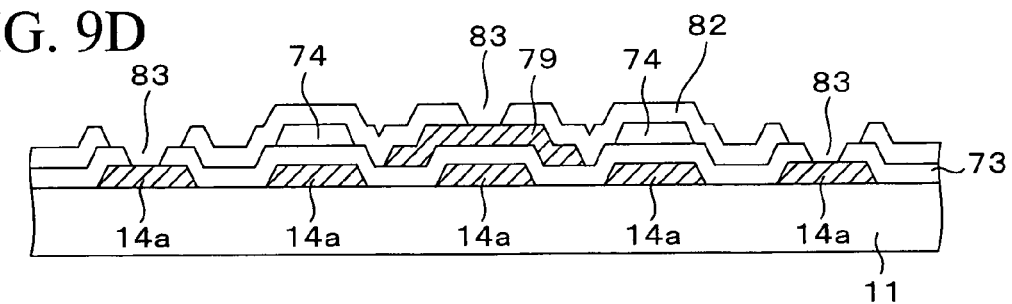

Subsequently, as shown in FIG. 9D, a second insulating film 82 made of, for example, SiN is formed on the entire upper surface of the glass substrate 11, thus covering the data bus line 22, the TFT 23, and the second metal film patterns 79 with this second insulating film 82. Then, by photolithography, the contact hole 27a communicating with the source electrode 23a is formed, and a plurality of fourth opening portions 83 communicating with the auxiliary capacitor electrode 14, the first metal patterns 14a, and the second metal film patterns 79 are formed.

Figure 9E:
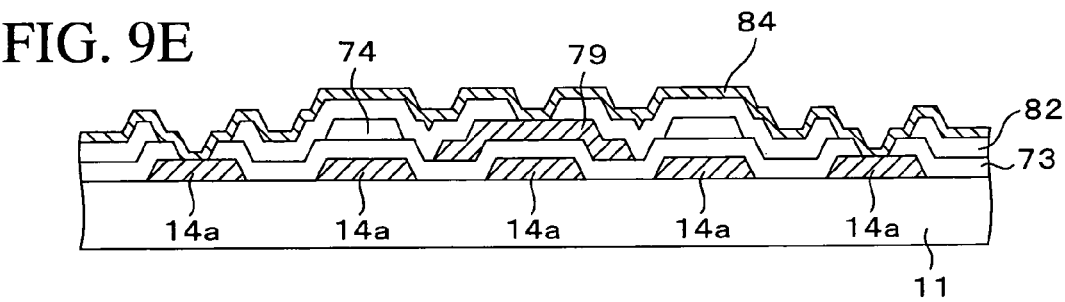

Thereafter, as shown in FIG. 9E, a third metal film 84 made of transparent conductive material, such as ITO or the like, is formed on the entire upper surface of the glass substrate 11.

Figure 9F:
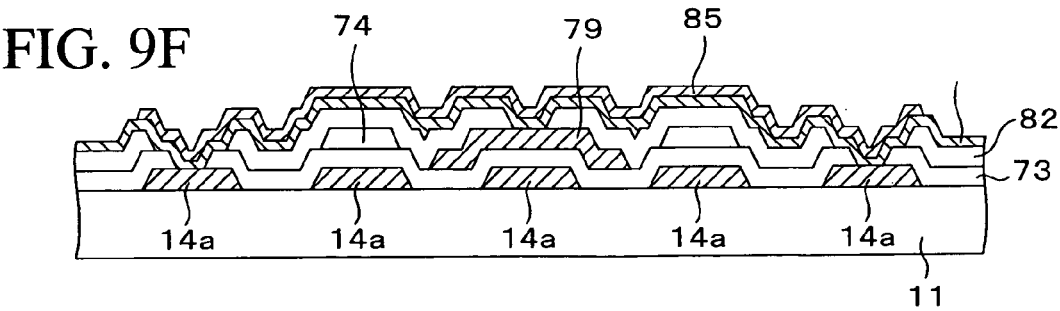
Figure 10D:
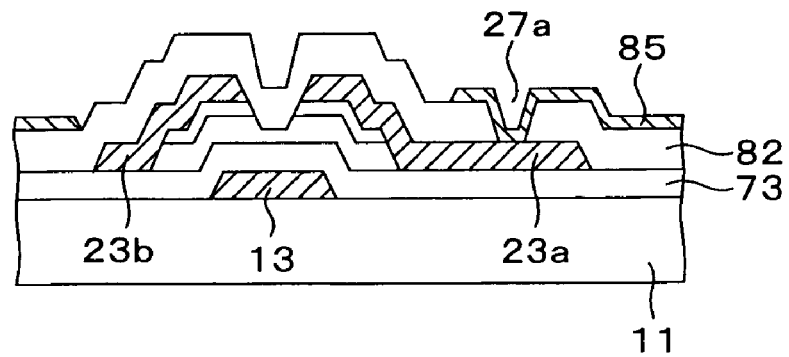

Subsequently, as shown in FIGS. 9F and 10D, the third metal film 84 is patterned, thus forming transparent picture element electrodes 84a. Then, a fourth metal film in which at least the uppermost layer is made of high-reflectance metal containing Al, Ag, or the like as a major constituent is formed. This fourth metal film is patterned, thus forming a reflective electrode 85. Further, a vertical alignment film covering the surfaces of the transparent picture element electrodes 84a and the reflective electrode 85 is formed of, for example, polyimide. Thus, the TFT substrate is completed. Thereafter, the TFT substrate and the counter substrate are placed to face each other, and liquid crystals are filled into the space between the TFT substrate and the counter substrate. Thus, the liquid crystal display device of the present embodiment is completed.

The present embodiment has, in addition to an effect similar to that of the first embodiment, the effect that manufacturing cost can be reduced compared to the liquid crystal display device of the first embodiment, because the number of steps of forming insulating films is smaller than that in the first embodiment.

Fourth Embodiment

Hereinafter, a fourth embodiment of the present invention will be described. In the present embodiment, an example will also be described in which the present invention is applied to a method of manufacturing a liquid crystal display device having channel etch-type TFTs.

FIGS. 11A to 11E are cross-sectional views showing a method of manufacturing a liquid crystal display device of the fourth embodiment of the present invention. These FIGS. 11A to 11E are cross-sectional views in the reflective region B. Further, in the present embodiment, the same components as those of the first embodiment will also be described with reference to FIG. 2. Furthermore, the structure of the counter substrate is the same as that of the first embodiment and therefore will not be further described here.

Figure 11A:
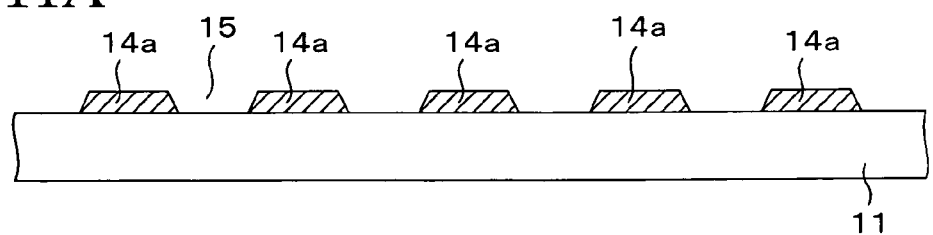
FIGS. 11A to 11E are cross-sectional views showing a method of manufacturing a liquid crystal display device of a fourth embodiment of the present invention.

First, as shown in FIG. 11A, an Al film, a MoN film, and a Mo film are sequentially formed on the upper side of the glass substrate 11 which serves as the base of the TFT substrate 10 by, for example, sputtering, thus forming a first metal film having a three-layered structure of the Al film, the MoN film, and the Mo film. Then, the first metal film is patterned by photolithography, thus forming the gate bus line 13, the auxiliary capacitor bus line 14, and the first metal film patterns 14a. At this time, similar to the first embodiment, a plurality of opening portions 15 are formed in each of the wide portion of the auxiliary capacitor bus line 14 and the first metal film patterns 14a.

Figure 11B:
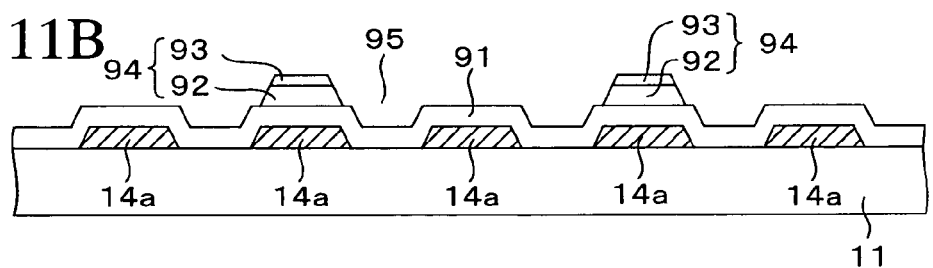

Next, as shown in FIG. 11B, SiN is deposited on the entire upper surface of the glass substrate 11 by CVD to form a first insulating film 91, thus covering the gate bus line 13, the auxiliary capacitor bus line 14, and the first metal film patterns 14a with this first insulating film 91. Then, a first semiconductor film 92, which serves as an active layer of the TFT 23, is formed of an undoped amorphous silicon film or an undoped polysilicon film on the first insulating film 91. Further, on the resultant structure, a second semiconductor film 93, which serves as an ohmic contact layer, is formed of amorphous silicon into which n-type impurities are introduced at high density. Thereafter, the first and second semiconductor films 92 and 93 are patterned by photolithography, thus forming an island-shaped semiconductor film in a TFT formation region. Moreover, simultaneously with this, as shown in FIG. 11B, semiconductor film patterns 94 including the first and second semiconductor films 92 and 93 are formed on the first insulating film 91 over the first metal film patterns 14a, and second opening portions 95 are formed in the semiconductor film patterns 94. These second opening portions 95 are formed to have sizes and arrangement pitches which are different from those of the first opening portions 15 formed in the auxiliary capacitor bus line 14 and the first metal film patterns 14a.

Figure 11C:
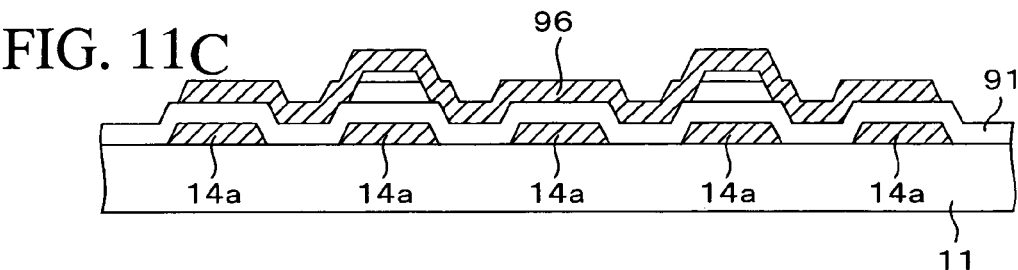

Next, as shown in FIG. 11C, a second metal film having, for example, a three-layered structure of a Ti film (having a thickness of 20 nm), an Al film (having a thickness of 75 nm), and a Ti film (having a thickness of 40 nm) is formed on the entire upper surface of the glass substrate 11. Then, this second metal film is patterned, thus forming the data bus line 22, the source electrode 23a, and the drain electrode 23b. Simultaneously with this, second metal film patterns 96 are formed at positions facing the first metal film patterns 14a.

Figure 11D:
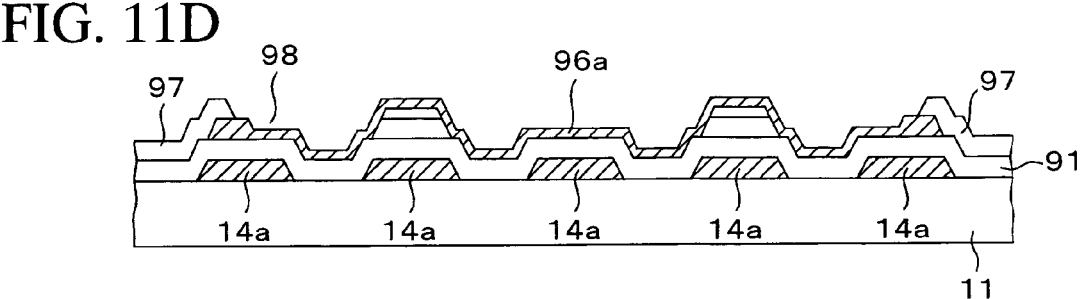

Next, as shown in FIG. 11D, a second insulating film 97 is formed on the entire upper surface of the glass substrate 11. In the second insulating film 97, the contact hole 27a communicating with the source electrode 23a is formed, and opening portions 98 through which the second metal film patterns 96 are exposed are formed. At this time, the Al film in the intermediate layer is exposed by etching the surfaces of the metal film patterns 96, and serves as a reflective electrode 96a.

Incidentally, the intermediate layer can be formed of high-reflectance metal containing Al, Ag, or the like as a major constituent, and the covering layer can be formed of metal containing refractory metal, such as Ti, Mo, or the like, as a major constituent.

Figure 11E:
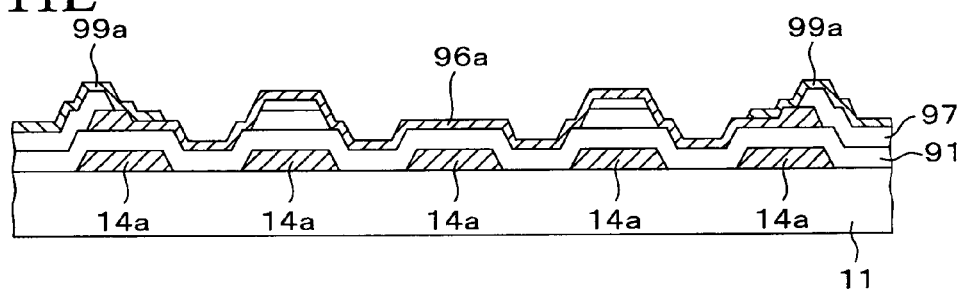

Next, as shown in FIG. 11E, a third metal film made of transparent conductive material, such as ITO or the like, is formed on the entire upper surface of the glass substrate 11. This third metal film is patterned, thus forming transparent picture element electrodes 99a. Then, a vertical alignment film covering the surfaces of the transparent picture element electrodes 99a and the reflective electrode 96a is formed of, for example, polyimide. Thus, the TFT substrate is completed. Thereafter, the TFT substrate and the counter substrate are placed to face each other, and liquid crystals are filled into the space between the TFT substrate and the counter substrate. Thus, the liquid crystal display device of the present embodiment is completed.

The present embodiment has, in addition to an effect similar to that of the first embodiment, the effect that manufacturing cost can be reduced compared to the first embodiment, because the number of steps of forming insulating films and the number of steps of forming metal films are smaller than those in the first embodiment.

Incidentally, in the above-described first to fourth embodiments, examples have been described in which the present invention is applied to a semi-transmissive liquid crystal display device. However, it is a matter of course that the present invention can be applied to a reflective liquid crystal display device. Further, the present invention is not limited to liquid crystal display devices having the structures described in the first to fourth embodiments, but can be applied to other liquid crystal display devices having reflective plates.

What is claimed is:

1. A liquid crystal display device comprising:
   a first substrate;
   a second substrate which is placed to face the first substrate and which transmits light;
   a reflective film which is formed over the first substrate and which reflects light passing through the second substrate;
   a plurality of films formed between the first substrate and the reflective film in a laminated manner; and
   liquid crystals contained between the first and second substrates,
   wherein patterns having arrangement pitches which are different for each film are formed in the plurality of films, the reflective film is formed directly on a surface of at least one of the plurality of films, and bumps and dips corresponding to the patterns of the plurality of films are formed in a surface of the reflective film, and
   the arrangement pitches of the patterns other than the pattern having the smallest arrangement pitch are in a range of 1.09 to 1.82 times the arrangement pitch of the pattern having the smallest arrangement pitch.

2. The liquid crystal display device according to claim 1, wherein each picture element region of a plurality of picture element regions has a reflective region for performing display using light reflected by the reflective film and a transmissive region for performing display using light passing through the first and second substrates.

3. The liquid crystal display device according to claim 1, wherein the second substrate has a color filter in which an opening portion is provided at a position facing the reflective film of the first substrate.

4. The liquid crystal display device according to claim 3, wherein a size of the opening portion of the color filter is smaller than that of the reflective film.

5. The liquid crystal display device according to claim 4, wherein a transparent resin film is formed in and around the opening portion of the color filter.

6. The liquid crystal display device according to claim 5, wherein optical diffusion capability is imparted to the transparent resin film.

7. The liquid crystal display device according to claim 5, wherein a film thickness of the transparent resin film is larger than that of the color filter.

8. The liquid crystal display device according to claim 1, wherein a cross-sectional shape of all of the patterns provided in at least one of the plurality of films is a forward tapered shape of 15° to 70°.

9. The liquid crystal display device according to claim 1, wherein vertical alignment films are formed on the first and second substrates, and the liquid crystals have negative dielectric anisotropy.

10. The liquid crystal display device according to claim 9, wherein a first phase plate and a first polarizing plate are placed on one side of a liquid crystal panel which includes the first and second substrates and in which the liquid crystals are contained, and a second phase plate and a second polarizing plate are placed on other side of the liquid crystal panel.

* * * * *